Oct. 2, 1928.
B. V. COVERT
FILM MAGAZINE
Filed May 31, 1927
1,686,204
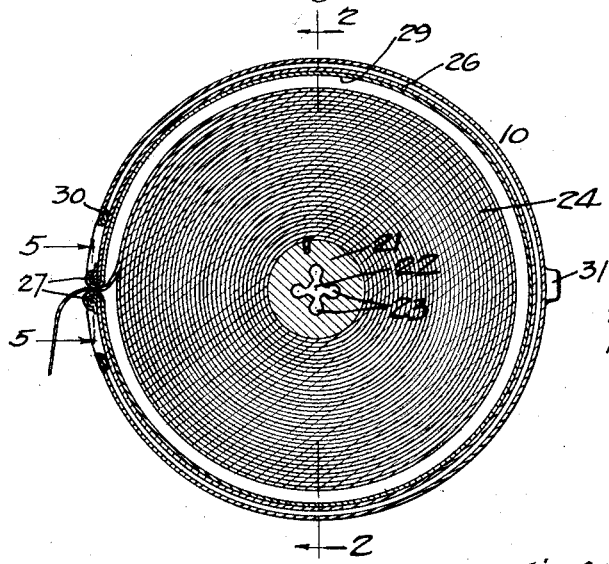
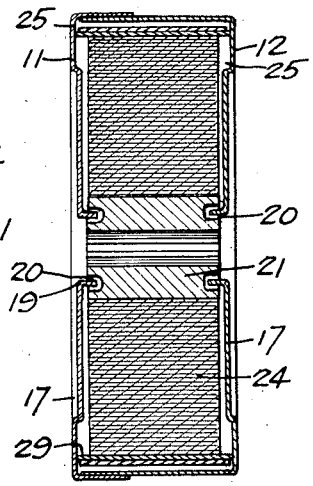
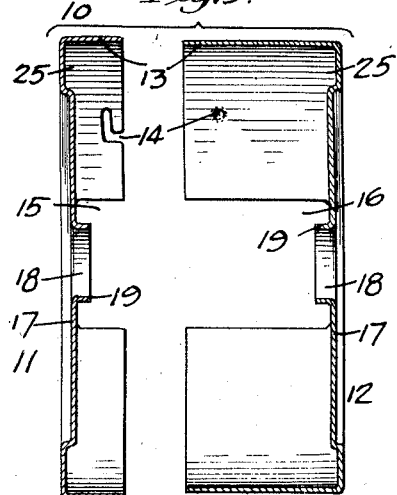
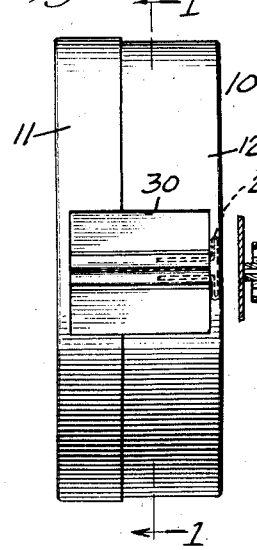
INVENTOR
BYRON V. COVERT
BY
*Munn & Co*
ATTORNEY Patented Oct. 2, 1928.

1,686,204

UNITED STATES PATENT OFFICE.

BYRON V. COVERT, OF LOCKPORT, NEW YORK.

FILM MAGAZINE.

Application filed May 31, 1927. Serial No. 195,464.

This invention relates to magazines for photographic films, and more particularly has to do with magazines of the type designed to accommodate spirally wound or "spool films" such as those employed in motion picture photography, and has for its primary object the provision of new, novel and positively acting means and mechanisms for sealing the magazine against the entrance of light thereto, thereby avoiding damage to the light sensitive face of the film.

Another object of the invention is to provide a magazine having an automatically controlled shutter for the discharge opening which will adapt itself to pulsating movements of the film as it is unwound from one magazine and delivered into a companion magazine.

A still further object of the invention is to provide a magazine and light excluding means therefor which will be simple of construction and which will permit of quick loading thereof and which will adapt itself to cameras of well known makes.
Other objects and advantages of the invention will be apparent as the following description is read in conjunction with the accompanying drawings forming a part of this application.
In the drawings Figure 1 is a vertical section through the magazine;

Figure 2 is a section on the line 2—2 of Figure 1;
Figure 3 is a sectional view of the companion magazine sections;

Figure 4 is an edge view of the magazine; and

Figure 5 is a section on the line 5—5 of Figure 1.

In carrying the invention into practice, use is made of a cylindrical magazine 10 consisting of mating telescopic sections 11 and 12 whose peripheral walls 13 are adapted to be maintained in overlapped relation by bayonet joint connections 14 upstruck from said walls. The said connections further function to limit relative rotation of said sections 11 and 12 so that the cut-out 15 in the section 11 may be made to coincide or register with a mating cut 16 in the section 12, and in this manner permit the respective cut-outs to define a slot through which a film can be fed from the magazine.

The heads 17 of said sections 11 and 12 are formed with openings 18 whose walls are provided with inwardly projecting annular flanges 19 which are adapted to be freely accommodated in annular grooves 20 in the respective side faces of the customary spool 21. Said spool is formed with a shaft receiving passage 22 having lateral branches 23 whereby the spool will adapt itself to the standard forms of supporting shafts. The spool 21 is adapted to support the usual roll of film 24 arranged in spiral coiled form so that its front end can be extended through the slot, which latter is provided by the mutually coacting cut-outs 15 and 16. The width of the said slot is substantially coextensive with that of the film, and the length of this slot is calculated to allow for compensatory movement of the film (up and down), as the film is unwound from one magazine and fed into another magazine of the same design.

Each of the said sections 11 and 12 is formed with an annular groove 25 which extends laterally beyond the heads 17 and, as shown, the groove of one of said sections is located directly opposite the groove of the other said section.

Located within the magazine, concentric with the axis thereof, is what I have elected to term a floating light excluder 26 in the form of a split flexible or resilient ring which encircles the coil or film 24 and which traverses the film outlet opening produced by the respective cut-outs 15 and 16, acting shutter-like across said opening. The ring has its respective ends formed with loops 27 which are urged together by means of a U-shaped spring clip 28, the legs 28ª of which are removably extended into said loops. The inner face of the ring is lined with a strip of soft fabric 29 whose width is greater than that of the ring, so that the respective side edges thereof project into the mating grooves 25 in said heads 17 for frictional and light excluding contact therewith. The edge portions of the cut-outs 15 and 16 are lined with soft fabric material 30, over which the adjacent outer faces of the ring are adapted to move while in close contact therewith. The respective ends of the fabric 29 are extended over the loops 27, which latter serve to yieldingly grip the two sides of the strip of film directly behind the aforementioned film discharge opening in said magazine.

In view of the structure herein recited and shown, it follows that all joints between the companion sections of the magazine are covered; likewise is the film discharge opening housed against the entrance of any light to the magazine, and in consequence thereof the film, at its edges, as well as at all other places, is preserved against all possibility of being light-struck. The film is actually encased within a light excluding structure that positively functions in conjunction with the magazine walls to compensate itself to all normal movements of the film incident to change in the diameter of the film coil as the film is delivered from the magazine. In order that the magazine may be held stationary while in use so that the coil of film can be actuated in the usual manner, I provide the section 12 with a fixed lug 31 which may be secured in position within the camera by engaging it with a fixed object or co-acting lug, not shown.

I claim:

1. A magazine for coil films comprising a structure having a film slot, and a light excluding element of contractible material adapted to embrace a coil of film and provided with means in coaction with the walls of the magazine to seal the film against the entrance of light thereto, the said element mounted within the magazine for curvilinear movement and formed to permit the film to be moved through said slot.

2. A magazine for coil films having a contractible coil embracing element in light sealed contact with the walls of the magazine, the magazine and said element adapted for relative curvilinear motion and the said element formed to permit the film to pass from within the element and through the film slot in the magazine.

3. A magazine for coil films comprising complementary sections adapted to mutually define a space for a coil of film, means to permit the coil to revolve in the magazine, the sections having portions respectively providing a slot for the passage of the film, and a yieldable split ring contained within the magazine and having its ends positioned behind the slot and adapted for impingement against the respective sides of the film, the ring adapted to contain the film coil therein and provided with means bearing against the walls of said sections to exclude light from the magazine.

4. A magazine for coil films comprising complementary sections adapted to mutually define a space for a coil of film, means to permit the coil to revolve in the magazine, the sections having portions respectively providing a slot for the passage of the film, a yieldable split ring contained within the magazine and having its ends positioned behind the slot and adapted for impingement against the respective sides of the film, the ring adapted to contain the film coil therein and provided with means bearing against the walls of said sections to exclude light from the magazine, the magazine and said ring being associated with each other so as to permit the ring to move in a curvilinear path within said magazine.

5. A film magazine having a floating light excluding shutter at the film slot, said shutter having relatively movable portions adapted to yieldingly bear against the respective sides of the film.

6. A film slotted magazine having a floating light excluding shutter at the film slot, said shutter having relatively movable portions adapted to yieldingly bear against the respective sides of the film, the said shutter mounted for curvilinear motion within said magazine.

7. A film magazine having yielding coacting film engaging portions at the film slot mounted within the magazine for curvilinear movement and constituting a shutter, the said portions coacting with the walls of the magazine to constitute a closure for said slot, and a light-excluding material carried by the shutter and arranged in sliding contact with the adjacent walls of the magazine.

8. A film magazine having a freely floating light excluder at the film slot of the magazine, the same comprising a ring split transversely at one point, the said light excluder having light excluding contact with the walls of the magazine.

9. A film magazine having a concentric split ring within which a coil of film is adapted to be contained, means to establish a light-tight connection between the ring and the magazine body and between the ends of the ring and the film when the latter is interposed between said ends, the magazine having parallel spaced apart heads, and annular flanges formed upon the central portions of said heads for mutually supporting a film spool for rotary motion within the magazine.

10. A film magazine having a concentric split ring within which a coil of film is adapted to be contained, and means to establish a light-tight connection between the ring and the magazine body and between the ends of the ring and the film when the latter is interposed between said ends, the said ring ends adapted to be disposed behind the film slot of said magazine, and provided with loops, and a spring clip engaged with said loops to advance the ring ends together.

11. A film magazine comprising mating telescopic sections provided with peripheral walls, means for joining the peripheral walls together so as to prevent lateral separation of the sections, each section having a head, the respective heads formed with means to support a film spool for rotary motion within the magazine, the sections having their peripheral walls provided with co-inciding walls, a floating ring within the magazine and provided with resilient ends positioned in line with the co-inciding slots, and a strip of light-excluding material carried by the ring, the said material having a width in excess of that of the ring so that the free edges of the material bear frictionally against the heads of the respective sections.

BYRON V. COVERT.